United States Patent
Kohinata

(10) Patent No.: US 11,932,731 B2
(45) Date of Patent: Mar. 19, 2024

(54) AROMATIC POLYSULFONE RESIN, EPOXY RESIN COMPOSITION, PREPREG, AND MOLDED BODY

(71) Applicant: SUMITOMO CHEMICAL COMPANY, LIMITED, Tokyo (JP)

(72) Inventor: Yusaku Kohinata, Tokyo (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 242 days.

(21) Appl. No.: 17/417,350

(22) PCT Filed: Dec. 23, 2019

(86) PCT No.: PCT/JP2019/050289
§ 371 (c)(1),
(2) Date: Jun. 22, 2021

(87) PCT Pub. No.: WO2020/137942
PCT Pub. Date: Jul. 2, 2020

(65) Prior Publication Data
US 2022/0073682 A1    Mar. 10, 2022

(30) Foreign Application Priority Data

Dec. 25, 2018 (JP) ................... 2018-241611

(51) Int. Cl.
| | | |
|---|---|---|
| C08G 75/23 | (2006.01) | |
| C08G 59/50 | (2006.01) | |
| C08J 5/24 | (2006.01) | |
| C08L 63/04 | (2006.01) | |

(52) U.S. Cl.
CPC ............ *C08G 75/23* (2013.01); *C08G 59/50* (2013.01); *C08J 5/243* (2021.05); *C08L 63/04* (2013.01)

(58) Field of Classification Search
CPC ..................................... C08G 75/23
See application file for complete search history.

(56) References Cited

U.S. PATENT DOCUMENTS

| | | |
|---|---|---|
| 2011/0201747 A1 | 8/2011 | Weber et al. |
| 2019/0040203 A1* | 2/2019 | Ohtomo ............... C08G 75/23 |
| 2019/0071542 A1 | 3/2019 | Ohtomo et al. |

FOREIGN PATENT DOCUMENTS

| | | |
|---|---|---|
| CN | 105504263 A | 4/2016 |
| JP | 2002-172675 A | 6/2002 |
| JP | 2009-167333 A | 7/2009 |
| JP | 2010-077185 A | 4/2010 |
| JP | 2017-141426 A | 8/2017 |
| JP | 2017-141427 A | 8/2017 |
| WO | 2005/095491 A1 | 10/2005 |
| WO | WO-2017135379 A1 * | 8/2017 ............ C08G 65/40 |

OTHER PUBLICATIONS

India Office Action issued in corresponding India Patent Application No. 202147032342, dated Aug. 8, 2022, with English translation.
International Search Report issued in corresponding International Patent Application No. PCT/JP2019/050289, dated Mar. 17, 2020, with English translation.

* cited by examiner

Primary Examiner — Megan McCulley
(74) Attorney, Agent, or Firm — Rimon PC

(57) ABSTRACT

An aromatic polysulfone resin produced by the polycondensation of 4,4'-dihydroxydiphenylsulfone represented by chemical formula (S1) shown below and 2-(4-(4-hydroxyphenylsulfonyl)phenoxy)-5-(4-hydroxyphenylsulfonyl)phenol represented by chemical formula (S2) shown below with 4,4'-dichlorodiphenylsulfone represented by chemical formula (S3) shown below.

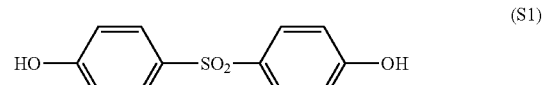

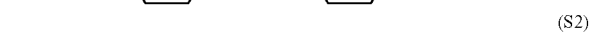

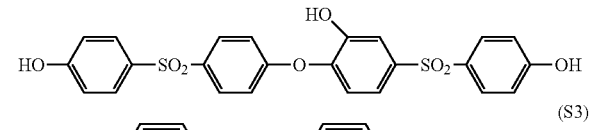

wherein hydrogen atoms in phenylene groups in formula (S1), formula (S2) and formula (S3) may be each independently substituted with an alkyl group, an aryl group or a halogen atom.

14 Claims, No Drawings

AROMATIC POLYSULFONE RESIN, EPOXY RESIN COMPOSITION, PREPREG, AND MOLDED BODY

CROSS REFERENCE TO RELATED APPLICATIONS

This application is the U.S. National Phase under 35 U.S.C. § 371 of International Application No. PCT/JP2019/050289, filed on Dec. 23, 2019, which claims the benefit of Japanese Application No. 2018-241611, filed on Dec. 25, 2018, the entire contents of each are hereby incorporated by reference.

TECHNICAL FIELD

The present invention relates to an aromatic polysulfone resin, an epoxy resin composition, a prepreg, and a molded body.

BACKGROUND ART

Aromatic polysulfone resins exhibit excellent heat resistance and chemical resistance, and am therefore used in a variety of applications, Aromatic polysulfone resins are typically resins having a repeating unit containing a divalent aromatic group (a residue obtained from an aromatic compound by removing two hydrogen atoms bonded to the aromatic ring), a sulfonyl group (—$SO_2$—) and an oxygen atom (—O—).

In recent years, in the fields of transportation equipment including automobiles and aircraft, reductions in the weights of components are being used for the purpose of improving fuel efficiency. In order to achieve these component weight reductions, the use of resin materials instead of current metal materials as the material for all manner of components is under investigation. For example, by using a fiber-reinforced plastic (sometimes abbreviated as FRP) prepared by impregnating fiber with a resin as the molding material for an external plate member, an external plate member having a lighter weight and superior strength compared with current members can be obtained.

Composite materials using aromatic polysulfone resins are currently being investigated as resin materials that can replace metal materials. For example, Patent Document 1 proposes a carbon fiber-reinforced plastic (sometimes abbreviated as CFRP) prepared by impregnating carbon fiber with an aromatic polysulfone resin having a specific molecular weight.

CITATION LIST

Patent Documents

Patent Document 1: JP 2017-141427 A

SUMMARY OF INVENTION

Problems to be Solved by the Invention

However, compared with molded bodies obtained from metal materials, molded bodies obtained from resin materials tend to be prone to reductions in the compressive strength, particularly under high-temperature conditions (for example, temperatures exceeding 100° C. but not more than 180° C.). In light of this problem, resin materials capable of enhancing the compressive strength beyond that attainable with molded bodies obtained from conventional resin materials are required.

The present invention has been developed in light of the above circumstances, and has the objects of providing a molded body with high compressive strength even under high-temperature conditions, and an aromatic polysulfone resin, an epoxy resin composition and a prepreg that can be used for molding such a molded body.

Means to Solve the Problems

In order to achieve these objects, the present invention adopts the following aspects.

One embodiment of the present invention is an aromatic polysulfone resin produced by the polycondensation of 4,4'-dihydroxydiphenylsulfone represented by chemical formula (S1) shown below and 2-(4-(4-hydroxyphenylsulfonyl)phenoxy)-5-(4-hydroxyphenylsulfonyl)phenol represented by chemical formula (S2) shown below with 4,4'-dichlorodiphenylsulfone represented by chemical formula (S3) shown below.

[Chemical formula 1]

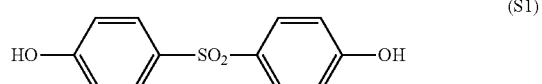

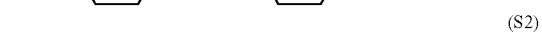

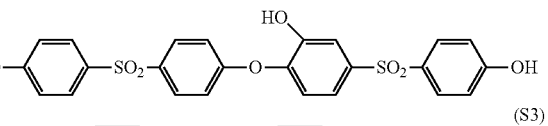

[The hydrogen atoms in phenylene groups in formula (S1), formula (S2) and formula (S3) may be each independently substituted with an alkyl group, an aryl group or a halogen atom.]

Further, one embodiment of the present invention is an epoxy resin composition containing the aromatic polysulfone resin described above, a liquid epoxy resin, and a curing agent.

Furthermore, one embodiment of the present invention is a prepreg produced by impregnating a reinforcing fiber with the epoxy resin composition described above.

In the prepreg of one embodiment of the present invention, the reinforcing fiber is preferably carbon fiber.

Further, one embodiment of the present invention is a molded body produced using a cured product of the prepreg described above as a molding material.

In one aspect, the present invention includes the following embodiments.

[1] An aromatic polysulfone resin produced by the polycondensation of 4,4'-dihydroxydiphenylsulfone represented by chemical formula (S1) shown below and 2-(4-(4-hydroxyphenylsulfonyl)phenoxy)-5-(4-hydroxyphenylsulfonyl)phenol represented by chemical formula (S2) shown below with 4,4'-dichlorodiphenylsulfone represented by chemical formula (S3) shown below.

[Chemical formula 2]

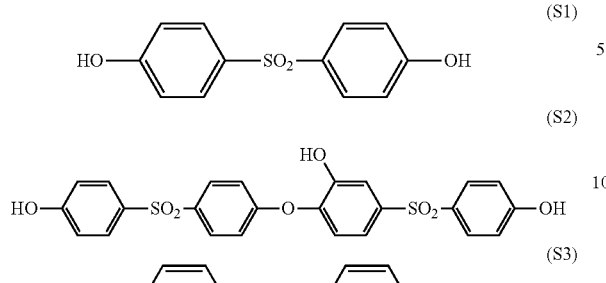

[The hydrogen atoms in phenylene groups in formula (S1), formula (S2) and formula (S3) may be each independently substituted with an alkyl group, an aryl group or a halogen atom.]

[2] An epoxy resin composition containing the aromatic polysulfone resin according to [1], a liquid epoxy resin, and a curing agent.

[3] A prepreg produced by impregnating a reinforcing fiber with the epoxy resin composition according to [2].

[4] The prepreg according to [3], wherein the reinforcing fiber is carbon fiber.

[5] A molded body containing a cured product of the prepreg according to [3] or [4].

Effects of the Invention

By using the aromatic polysulfone resin, the epoxy resin composition or the prepreg of aspects of the present invention, a molded body can be provided that exhibits high compressive strength even under high-temperature conditions.

EMBODIMENTS FOR CARRYING OUT THE INVENTION (Aromatic Polysulfone Resin)

The aromatic polysulfone resin of one embodiment of the present invention is produced by the polycondensation of 4,4'-dihydroxydiphenylsulfone represented by chemical formula (S1) shown below and 2-(4-(4-hydroxydiphenylsulfone)phenoxy)-5-(4-hydroxyphenylsulfonyl)phenol represented by chemical formula (S2) shown below with 4,4'-dichlorodiphenylsulfone represented by chemical formula (S3) shown below.

In one aspect, the aromatic polysulfone resin of this embodiment is
  an aromatic polysulfone resin obtained by the polycondensation of 4,4'-dihydroxydiphenylsulfone represented by chemical formula (S1) shown below and 4,4'-dichlorodiphenylsulfone represented by chemical formula (S3) shown below, and the polycondensation of 2-(4-(4-hydroxyphenylsulfonyl)phenoxy)-5-(4-hydroxyphenylsulfonyl)phenol represented by chemical formula (S2) shown below and 4,4'-dichlorodiphenylsulfone represented by chemical formula (S3) shown below.

In another aspect, the aromatic polysulfone resin of this embodiment is an aromatic polysulfone resin containing
  a repeating unit derived from a compound obtained by the polycondensation of 4,4'-dihydroxydiphenylsulfone represented by chemical formula (S1) shown below and 4,4'-dichlorodiphenylsulfone represented by chemical formula (S3) shown below, and
  a repeating unit derived from a compound obtained by the polycondensation of 2-(4-(4-hydroxyphenylsulfonyl)phenoxy)-5-(4-hydroxyphenylsulfonyl)phenol represented by chemical formula (S2) shown below and 4,4'-dichlorodiphenylsulfone represented by chemical formula (S3) shown below.

[Chemical formula 3]

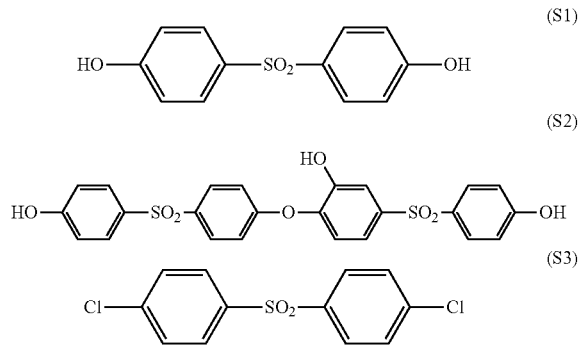

[The hydrogen atoms in phenylene groups in formula (S1), formula (S2) and formula (S3) may be each independently substituted with an alkyl group, an aryl group or a halogen atom.]

The alkyl group which may substitute any of the hydrogen atoms in the phenylene groups in formula (S1), formula (S2) and formula (S3) is preferably an alkyl group of 1 to 10 carton atoms, and examples include a methyl group, ethyl group, n-propyl group, isopropyl group, n-butyl group, isobutyl group, s-butyl group, t-butyl group, n-hexyl group, 2-ethylhexyl group, n-octyl group and n-decyl group.

The aryl group which may substitute any of the hydrogen atoms in the phenylene groups in formula (S1), formula (S2) and formula (S3) is preferably an aryl group of 6 to 20 carbon atoms, and examples include a phenyl group, o-tolyl group, m-tolyl group, p-tolyl group, 1-naphthyl group and 2-naphthyl group.

Examples of the halogen atom which may substitute any of the hydrogen atoms in the phenylene groups in formula (S1), formula (S2) and formula (S3) include a chlorine atom, bromine atom and iodine atom.

In those cases where one or more hydrogen atoms in the phenylene groups in formula (S1), formula (S2) and formula (S3) are substituted with these groups, the number of such substitutions per phenylene group is, independently, typically 2 or fewer, and is preferably 1.

The polycondensation mentioned above is preferably conducted in a solvent using an alkali metal salt of carbonic acid.

The alkali metal salt of carbonic acid may be a normal alkali carbonate salt, may be an acidic alkali hydrogen carbonate salt, or may be a mixture of both. Examples of alkali carbonates that may be used favorably include sodium carbonate and potassium carbonate. Examples of alkali bicarbonates that may be used favorably include sodium bicarbonate and potassium bicarbonate.

Examples of solvents that may be used favorably include organic polar solvents such as dimethyl sulfoxide, 1-methyl-2-pyrrolidone, sulfolane, 1,3-dimethyl-2-imidazolidinone, 1,3-diethyl-2-imidazolidinone, dimethyl sulfone, diethyl sulfone, diisopropyl sulfone, and diphenyl sulfone.

In the polycondensation, assuming that side reactions do not occur, the closer the molar ratio between the dihalogenosulfone compound having two halogen groups and a sulfonyl group within the molecular structure and the dihydroxysulfone compound having two hydroxyl groups and a sulfonyl group within the molecular structure is to 1:1, the greater the amount used of the alkali metal salt of carbonic acid, the higher the polycondensation temperature, or the longer the polycondensation time, the higher the degree of polymerization of the obtained aromatic polysulfone resin is likely to become, and the higher the reduced viscosity is likely to become.

In actuality, as a result of by-product alkali hydroxide and the like, side reactions such as substitution reactions of halogeno groups with hydroxyl groups and depolymerization reactions tend to occur. These side reactions tend to lower the degree of polymerization of the obtained aromatic polysulfone resin and increase the likelihood of a decrease in the reduced viscosity.

For these types of reasons, the extent of these side reactions is preferably considered, and the molar ratio between the dihalogenosulfone compound exemplified by the above formula (S3) and the dihydroxysulfone compound exemplified by the above formula (S1), the amount used of the alkali metal salt of carbonic acid, the polycondensation temperature and the polycondensation time are preferably each adjusted appropriately so as to obtain an aromatic polysulfone resin having the desired reduced viscosity.

The aromatic polysulfone resin generally has a repeating unit represented by formula (1) shown below (hereinafter sometimes referred to as the "repeating unit (1)").

$$-Ph^1-SO_2-Ph^2-O- \quad (1)$$

$Ph^1$ and $Ph^2$ each independently represent a phenylene group. The hydrogen atoms in the phenylene groups may be each independently substituted with an alkyl group, an aryl group, a hydroxyl group, or a halogen atom.

The aromatic polysulfone resin may also have, in addition to the repeating unit (1), at least one type of other repeating unit such as a repeating unit represented by formula (2) shown below (hereinafter sometimes referred to as the "repeating unit (2)") or a repeating unit represented by formula (3) shown below (hereinafter sometimes referred to as the "repeating unit (3)").

$$-Ph^3-R-Ph^4-O- \quad (2)$$

$Ph^3$ and $Ph^4$ each independently represent a phenylene group. The hydrogen atoms in the phenylene groups may be each independently substituted with an alkyl group, an aryl group, or a halogen atom. R represents an alkylidene group, an oxygen atom or a sulfur atom.

For example, by using 4,4'-dichlorodiphenylsulfone as the dihalogenosulfone compound, and using a compound represented by a formula (4): $HO-Ph^3-R-Ph^4-OH$ as the dihydroxy compound, a resin having the repeating unit (1) and the repeating unit (2) can be produced.

$$-(Ph^5)_y-O- \quad (3)$$

$Ph^5$ represents a phenylene group. The hydrogen atoms in the phenylene group may be each independently substituted with an alkyl group, an aryl group, or a halogen atom. Further, y represents an integer of 1 to 3. When y is 2 or greater, the plurality of $Ph^5$ groups that exist may be the same or different.

A resin having the repeating unit (1) and the repeating unit (3) can be produced by using 4,4'-dichlorodiphenylsulfone as the dihalogenosulfone compound, and using a compound represented by a formula (5): $HO-(Ph^5)_y-OH$ as the dihydroxy compound.

Each of the phenylene groups represented by any of $Ph^1$ to $Ph^5$ may be a p-phenylene group, an m-phenylene group or an o-phenylene group, but is preferably a p-phenylene group.

Examples of the substituents which may substitute a hydrogen atom in the phenylene group include the same groups as those described above for the "alkyl group, aryl group and halogen atom that may substitute a hydrogen atom in the phenylene group".

In those cases where one or more hydrogen atoms in a phenylene group are substituted with these groups, the number of such substitutions per phenylene group is, independently, typically 2 or fewer, and is preferably 1.

The alkylidene group for R is preferably an alkylidene group of 1 to 5 carbon atoms, and examples include a methylene group, ethylidene group, isopropylidene group, and 1-butylidene group.

The aromatic polysulfone resin preferably has at least 50 mol % but not more than 99.9 mol %, and more preferably at least 80 mol % but not more than 99.9 mol %, of the repeating unit (1) relative to the total (100 mol %) of all the repeating units. The aromatic polysulfone resin may have two or more types of each of the repeating units (1) to (3).

The aromatic polysulfone resin of one embodiment of the present invention has a repeating unit (1) produced by the polycondensation of 2-(4-(4-hydroxyphenylsulfonyl)phenoxy)-5-(4-hydroxyphenylsulfonyl)phenol represented by the above chemical formula (S2) and 4,4'-dichlorodiphenylsulfone represented by the above chemical formula (S3), and a repeating unit (11) produced by the polycondensation of 4,4'-dihydroxydiphenylsulfone represented by the above chemical formula (S1) and 4,4'-dichlorodiphenylsulfone represented by the above chemical formula (S3).

In another aspect, the aromatic polysulfone resin of one embodiment of the present invention has at least one repeating unit (I) selected from the group consisting of a repeating unit (Ia) represented by chemical formula (Ia) shown below, a repeating unit (Ib) represented by chemical formula (Ib) shown below, a repeating unit (Ic) represented by chemical formula (Ic) shown below and a repeating unit (Id) represented by chemical formula (Id) shown below, and a repeating unit (II) represented by chemical formula (II) shown below.

<Repeating Unit (I)>

The repeating unit (I) in an embodiment of the present invention is a repeating unit produced by the polycondensation of 2-(4-(4-hydroxyphenylsulfonyl)phenoxy)-5-(4-hydroxyphenylsulfonyl)phenol represented by the above chemical formula (S2) and 4,4'-dichlorodiphenylsulfone represented by the above chemical formula (S3).

In other words, the repeating unit (I) is at least one repeating unit selected from the group consisting of repeating units represented by chemical formula (Ia) shown below, chemical formula (Ib) shown below, chemical formula (Ic) shown below and chemical formula (Id) shown below.

[Chemical formula 4]

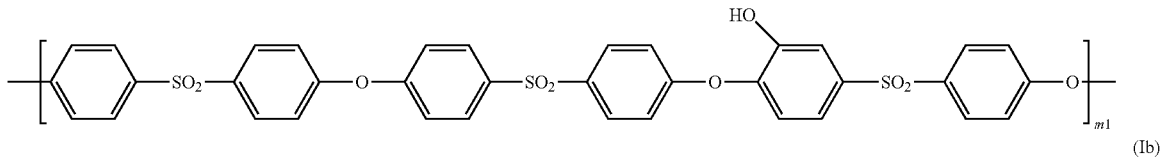
(Ia)

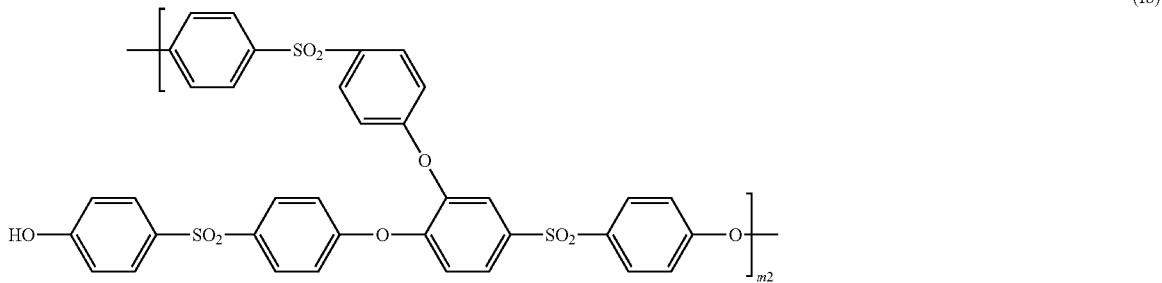
(Ib)

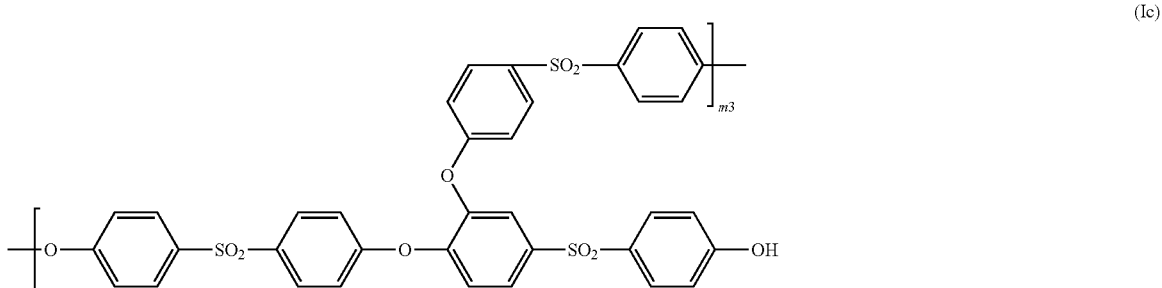
(Ic)

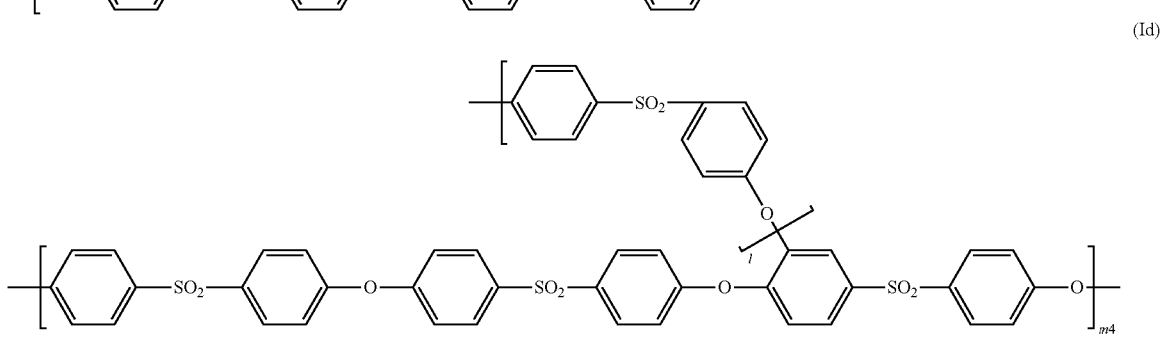
(Id)

[In the formulas, 1 represents an integer of 0 or greater. Each of m1, m2, m3 and m4 represents a number of 0 or greater, wherein m1+m2+m3+m4=m>0. The hydrogen atoms in phenylene groups in formula (Ia) to formula (Id) may be each independently substituted with an alkyl group, an aryl group or a halogen atom.]

The repeating unit (Ia) represented by chemical formula (Ia) is produced when 4,4'-dichlorodiphenylsulfone represented by the above chemical formula (S3) reacts with the two hydroxyl groups of the hydroxyphenyl groups at both terminals of 2-(4-(4-hydroxyphenylsulfonyl)phenoxy)-5-(4-hydroxyphenylsulfonyl)phenol represented by the above chemical formula (S2).

The repeating unit (Ib) represented by chemical formula (Ib) shown below is produced when 4,4'-dichlorodiphenylsulfone represented by the above chemical formula (S3) reacts with the hydroxyl group of the hydroxyphenyl group at one of the terminals of 2-(4-(4-hydroxyphenylsulfonyl)phenoxy)-5-(4-hydroxyphenylsulfonyl)phenol represented by the above chemical formula (S2), and with the hydroxyl group of the hydroxyphenylene group that exists near the center of the phenol molecule.

The repeating unit (Ic) represented by chemical formula (Ic) shown below is produced when 4,4'-dichlorodiphenylsulfone represented by the above chemical formula (S3) reacts with the hydroxyl group of the hydroxyphenyl group at the other terminal of 2-(4-(4-hydroxyphenylsulfonyl)phenoxy)-5-(4-hydroxyphenylsulfonyl)phenol represented by the above chemical formula (S2), and with the hydroxyl group of the hydroxyphenylene group that exists near the center of the phenol molecule.

The repeating unit (Id) represented by chemical formula (Id) shown below is produced when 4,4'-dichlorodiphenylsulfone represented by the above chemical formula (S3) reacts with the two hydroxyl groups of the hydroxyphenyl groups at both terminals of 2-(4-(4-hydroxyphenylsulfonyl) phenoxy)-5-(4-hydroxyphenylsulfonyl)phenol represented by the above chemical formula (S2), and with the hydroxyl group of the hydroxyphenylene group that exists near the center of the phenol molecule.

<Repeating Unit (II)>

The repeating unit (II) in an embodiment of the present invention is a repeating unit produced by the polycondensation of 4,4'-dihydroxydiphenylsulfone represented by the above chemical formula (S1) and 4,4'-dichlorodiphenylsulfone represented by the above chemical formula (S3).

In other words, the repeating unit (II) is a repeating unit represented by chemical formula (II) shown below.

[Chemical formula 5]

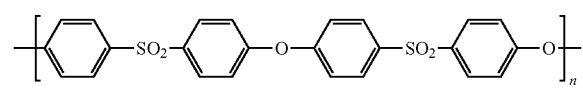

(11)

[In the formula, n represents a number greater than 0. The hydrogen atoms in the phenylene groups in the formula may be each independently substituted with an alkyl group, an aryl group or a halogen atom.]

In the aromatic polysulfone resin of an embodiment of the present invention, the ratio between the molar content (m) of the repeating unit (I) and the molar content (n) of the repeating unit (II) (namely, m:(n+½)) (hereinafter also referred to as the molar ratio) is preferably within a range from 1:450 to 1:200, more preferably from 1:400 to 1:250, even more preferably from 1:350 to 1:250, and particularly preferably from 1:350 to 1:280.

In another aspect, the ratio (m:(n+½)) between the molar content (m) of the repeating unit (I) and the molar content (n) of the repeating unit (II) may be within a range from 1:370 to 1:208, or from 1:370 to 1:270.

Provided that this ratio (m:(n+½)) falls within the above preferred range, the storage elastic modulus increases, and the compressive strength of the cured product can be more easily increased.

In this description, the ratio (m:(n+1l2)) between the molar content (m) of the repeating unit (I) and the molar content (n) of the repeating unit (11) includes the boundary values of the above preferred range.

The ratio (m:(n+I/2)) between the molar content (m) of the repeating unit (I) and the molar content (n) of the repeating unit (II) can be determined from the blend amounts (mol) of the raw material monomers used.

In embodiments of the present invention, consumption of all of the raw material monomers used in the polymerization (polycondensation) reaction can be confirmed.

In one aspect, the amount of the repeating unit (I), relative to the total amount (total number of moles) of all the repeating units that constitute the aromatic polysulfone resin, is typically within a range from 0.1 to 20 mol %, and preferably from 0.1 to 0.4 mol %.

The amount of the repeating unit (II), relative to the total amount (total number of moles) of all the repeating units that constitute the aromatic polysulfone resin, is typically within a range from 80 to 99.9 mol %, and preferably from 99.6 to 99.9 mol %.

The reduced viscosity of the aromatic polysulfone resin of an embodiment of the present invention is, for example, preferably at least 0.2 dL/g, more preferably at least 0.25 dL/g, and even more preferably 0.35 dL/g or greater, whereas the upper limit is preferably not more than 0.9 dL/g, and more preferably 0.8 dL/g or less.

The higher the reduced viscosity of the aromatic polysulfone resin, the more easily the heat resistance and strength can be improved, and provided the reduced viscosity is not more than the upper limit, workability is more easily maintained. Accordingly, the reduced viscosity of the aromatic polysulfone resin is preferably at least 0.2 dL/g but not more than 0.9 dL/g, more preferably at least 0.25 dL/g but not more than 0.9 dL/g, and even more preferably at least 0.35 dL/g but not more than 0.8 dL/g. In another aspect, the reduced viscosity of the aromatic polysulfone resin may be at least 0.50 dL/g but not more than 0.52 dL/g.

In embodiments of the present invention, the reduced viscosity of the aromatic polysulfone resin adopts the value determined in the following manner. Namely, 1 g of the aromatic polysulfone resin is dissolved in N,N-dimethylformamide, the volume of the solution is made up to 1 dl, and the viscosity ($\eta$) of this solution is measured at 25° C. using an Ostwald viscosity tube. Further, the viscosity ($\eta_0$) of the N,N-dimethylformamide used as the solvent is also measured at 25° C. using an Ostwald viscosity tube. Because the concentration of the above solution is Ig/dl, the value for the specific viscosity (($\eta-\eta_0)/\eta_0$) becomes the reduced viscosity (units: dl/g).

The aromatic polysulfone resin of the embodiment described above contains, in addition to the structures derived from 4,4'-dihydroxydiphenylsulfone represented by the above chemical formula (S1), structures derived from 2-(4-(4-hydroxyphenylsulfonyl)phenoxy)-5-(4-hydroxyphenylsulfonyl)phenol represented by the above chemical formula (S2). As a result, by using the aromatic polysulfone resin of this embodiment, a prepreg and an epoxy resin composition can be provided which function as molding materials for molded bodies having superior compressive strength even under high-temperature conditions. The compressive strength under high-temperature conditions can be evaluated, for example, by measuring the storage elastic modulus at 150° C. of a cured product of the epoxy resin composition.

(Epoxy Resin Composition)

An epoxy resin composition of an embodiment of the present invention contains the aromatic polysulfone resin described above, a liquid epoxy resin, and a curing agent.

<Aromatic Polysulfone Resin>

The aromatic polysulfone resin described above is used as the aromatic polysulfone resin in this embodiment. A single type of aromatic polysulfone resin may be used, or a combination of two or more types may be used.

The amount of the aromatic polysulfone resin in the epoxy resin composition is preferably within a range from 3 to 30 parts by mass, and more preferably from 5 to 20 parts by mass, per 100 parts by mass of the total mass of epoxy resin.

<Liquid Epoxy Resin>

A liquid epoxy resin is an epoxy resin that exists in a liquid state at 50° C. (under normal pressure).

Examples of the liquid epoxy resin in this embodiment include glycidylamine epoxy resins, phenol novolac epoxy resins, cresol novolac epoxy resins, glycidyl ether epoxy resins, bisphenol A epoxy resins, bisphenol F epoxy resins, and bisphenol S epoxy resins.

A single type of liquid epoxy resin may be used, or a combination of two or more types may be used.

The amount of the liquid epoxy resin in the epoxy resin composition is preferably within a range from 40 to 80% by mass, and more preferably from 50 to 70% by mass, relative to the total mass (100% by mass) of the epoxy resin composition.

<Curing Agent>

There are no particular limitations on the curing agent in this embodiment of the present invention, provided it is capable of reacting with the epoxy resin described above, and an amine-based curing agent can be used favorably.

Examples of such curing agents include tetramethylguanidine, imidazole or derivatives thereof, carboxylic acid hydrazides, tertiary amines, aromatic amine, aliphatic amines, and dicyandiamide or derivatives thereof.

A single type of curing agent may be used, or a combination of two or more types may be used.

The amount of the curing agent in the epoxy resin composition is preferably within a range from 20 to 50 parts by mass, and more preferably from 25 to 45 parts by mass, per 100 parts by mass of the total mass of epoxy resin.

<Other Components>

The epoxy resin composition of this embodiment may also contain other components besides the aromatic polysulfone resin, the liquid epoxy resin and the curing agent described above according to need. Examples of these other components include fillers, resins other than the liquid epoxy resin, additives, and solvents.

In one aspect, the epoxy resin composition of one embodiment of the present invention contains the aromatic polysulfone resin described above, a liquid epoxy resin, a curing agent, and another component.

Because the epoxy resin composition contains the aromatic polysulfone resin described above, a prepreg having excellent heat resistance and high compressive strength even under high-temperature conditions can be provided.

(Prepreg)

A prepreg of one embodiment of the present invention is produced by impregnating a reinforcing fiber with the epoxy resin composition described above.

From the viewpoint of the strength of the molded body, the reinforcing fiber is preferably at least one type of fiber selected from the group consisting of carbon fiber, glass fiber, boron fiber and aramid fiber, and from the viewpoint of the mechanical properties and lightweight properties, is more preferably carbon fiber. These reinforcing fibers may be either a woven fabric or an unwoven fabric.

There are no particular limitations on the method used for producing the prepreg of this embodiment, provided the reinforcing fiber is impregnated with the epoxy resin composition described above.

Examples of the method used for impregnating the reinforcing fiber with the epoxy resin composition include a wet method and a hot melt method (dry method).

The wet method is a method of impregnating the reinforcing fiber with the epoxy resin composition by immersing the reinforcing fiber in the epoxy resin composition, pulling the reinforcing fiber up out of the composition, and then evaporating the solvent from the reinforcing fiber using an oven or the like.

The hot melt method is a method of impregnating the reinforcing fiber directly with the epoxy resin composition, which has been reduced in viscosity by heating. Further, another form of the hot melt method is a method in which a film of the epoxy resin composition is prepared by coating the composition onto a release paper or the like, the film is then overlaid on both sides or one side of the reinforcing fiber, and thermocompression is then used to impregnate the reinforcing fiber with the epoxy resin composition.

Following impregnation of the reinforcing fiber with the epoxy resin composition in this manner, a prepreg can be produced, for example, by conducting heating at 120 to 150° C. to cure the impregnated epoxy resin composition. The curing of the impregnated epoxy resin composition may be semi-curing.

In this description, the term "semi-curing" describes a state in which the viscosity or hardness of the resin has been increased sufficiently to enable a fixed shape to be maintained, but a state from which the viscosity or hardness can be further increased to a state of increased viscosity or hardness.

Because the prepreg of the embodiment described above uses the aromatic polysulfone resin of the present invention described above, a molded body having high compressive strength even under high-temperature conditions can be obtained.

In order to obtain a molded body having high compressive strength even under high-temperature conditions, for example, the storage elastic modulus of the cured product of the epoxy resin composition at 150° C. is typically at least 1.95 GPa. and in order to obtain a molded body of even higher compressive strength, this storage elastic modulus is preferably at least 2.0 GPa, more preferably at least 2.2 GPa, and even more preferably 2.3 GPa or greater. The storage elastic modulus of the cured product of the epoxy resin composition at 150° C. is typically not more than 3.5 GPa.

In one aspect, the storage elastic modulus of the cured product of the epoxy resin composition at 150° C. is preferably at least 1.95 GPa but not more than 3.5 GPa, more preferably at least 2.0 GPa but not more than 3.5 GPa, even more preferably at least 2.2 GPa but not more than 3.5 GPa, and particularly preferably at least 2.3 Ga but not more than 3.5 GPa.

In another aspect, the storage elastic modulus of the cured product of the epoxy resin composition at 150° C. may be at least 1.96 GPa but not more than 2.32 GPa.

In this description, the storage elastic modulus can be determined by preparing a cured product of the epoxy resin composition with a thickness of 3 mm, and then measuring the storage elastic modulus of the cured product at 150° C. using a dynamic viscoelasticity measurement device.

Further, from the viewpoint of the heat resistance, the glass transition temperature of the cured product of the epoxy resin composition is preferably at least 230° C. but not more than 280° C. and more preferably at least 250° C. but not more than 280° C.

In one aspect, the glass transition temperature of the cured product of the epoxy resin composition may be at least 266° C. but not more than 269° C.

In this description, the glass transition temperature (° C.) of the cured product of the epoxy resin composition can be measured by preparing a cured product of the epoxy resin composition with a thickness of 3 mm, and then determining the glass transition temperature from the tan δ peak for the cured product measured using a dynamic viscoelasticity measurement device (Q800, manufactured by TA Instruments, Inc.).

(Molded Body)

A molded body of an embodiment of the present invention uses a cured product of the prepreg described above as the molding material.

Because the molded body of this embodiment has high compressive strength under high-temperature conditions (for example, temperatures exceeding 100° C. but not more than 180° C.), it can be used favorably in automobile and aircraft applications.

The molded body of this embodiment is composed of a plurality of layers of the prepreg described above. Specifically, the molded body can be obtained by stacking a plurality of the prepregs produced using the method described above, and then using an autoclave or heat press or the like to conduct thermosetting molding.

Examples of the pattern used when stacking the prepregs include methods in which the stacking is conducted with the direction of orientation of the reinforcing fibers contained in the prepregs aligned (0°), and methods in which the prepregs are stacked with the direction of orientation offset at an arbitrary angle. For example, when the angle is offset 45° for each prepreg, a 0°/45°/90°/135° 1180°/225°/270°/315°/360° (0°) structure is obtained.

The expression "offset at an arbitrary angle" means altering the relative angles of the directions of the fibers contained in two layers of the stacked prepregs. The arbitrary angle may be selected appropriately in accordance with the intended application for the molded body.

Because a prepreg that uses the aromatic polysulfone resin of the present invention described above is used in the molded body of this embodiment, the storage elastic modulus is high and the compressive strength can be increased, even under high-temperature conditions.

In one aspect, the aromatic polysulfone resin of one embodiment of the present invention has:
- at least one repeating unit (I) selected from the group consisting of a repeating unit (Ia) represented by chemical formula (Ia) shown above, a repeating unit (Ib) represented by chemical formula (Ib) shown above, a repeating unit (Ic) represented by chemical formula (Ic) shown above and a repeating unit (Id) represented by chemical formula (Id) shown above, and a repeating unit (II) represented by chemical formula (II) shown above, wherein
- the ratio between the molar content (m) of the repeating unit (I) and the molar content (n) of the repeating unit (II) (namely, m:(n+½)) is within a range from 1:450 to 1:200, preferably from 1:400 to 1:250, more preferably from 1:350 to 1:250, and even more preferably from 1:350 to 1:280, and may be within a range from 1:370 to 1:208, or from 1:370 to 1:270.

The aromatic polysulfone resin may have a reduced viscosity of at least 0.2 dL/g but not more than 0.9 dL/g, at least 0.25 dL/g but not more than 0.9 dL/g, at least 0.35 dL/g but not more than 0.8 dL/g, or at least 0.50 dL/g but not more than 0.52 dL/g.

EXAMPLES

The present invention is described below in further detail using a series of examples, but the present invention is in no way limited by the examples presented below.

[Measurement of Reduced Viscosity]

First, 1 g of the aromatic polysulfone resin was dissolved in N,N-dimethylformamide, the volume of the solution was made up to 1 dl, and the viscosity ($\eta$) of this solution was measured at 25° C. using an Ostwald viscosity tube. Further, the viscosity ($\eta_0$) of the N,N-dimethylformamide used as the solvent was also measured at 25° C. using an Ostwald viscosity tube. The specific viscosity (($\eta-\eta_0/\eta_0$) was then determined.

Because the concentration of the solution is Ig/dl, the value for the specific viscosity (($\eta-\eta_0/\eta_0$) becomes the reduced viscosity (units: dl/g).

[Measurement of Amount of 2-(4-(4-hydroxyphenylsulfonyl)phenoxy)-5-(4-hydroxyphenylsulfonyl)Phenol Represented by Above Chemical Formula (S2) in Dihydroxydiphenylsulfone Mixture]

The amount of 2-(4-(4-hydroxyphenylsulfonyl)phenoxy)-5-(4-hydroxyphenylsulfonyl)phenol represented by the above chemical formula (S2) relative to the total mass of the dihydroxydiphenylsulfone mixture was determined by liquid chromatography mass analysis (LC/MS) under the following conditions.

(Conditions)
Apparatus (LC): liquid chromatograph model LC-20A manufactured by Shimadzu Corporation
Sample: 10 μL of a solution prepared by dissolving a 10 mg sample in 10 mL of methanol was injected
Column: SUMIPEX ODS Z-CLUE (2.00 mmø×100 mm, 3 μm)
Mobile phase: water/acetonitrile was used, 15 minutes after the start of analysis, the mobile phase was changed from water/acetonitrile=80%/20% to acetonitrile 100%, acetonitrile 100% was maintained until 35 minutes, the mobile phase was then changed back to water/acetonitrile=80%/20% by 35.1 minutes, and water/acetonitrile=80%/20% was maintained until 45 minutes.
Flow rate: 0.5 mL/minute
Column temperature: 40° C.
Detector: UV/VIS 280 nm
Apparatus (MS): LTQ Orbitrap Discovery
Ionization method: APCI
Measurement scanning range: m/z 100 to 600
Collision-induced dissociation (CID): 35%

In the obtained mass spectrum, the total of the peak surface area detected between a retention time of 5 minutes and 25 minutes was deemed 100, and by determining the peak surface area detected from 22 minutes to 25 minutes using the area normalization method, the amount of 2-(4-(4-hydroxyphenylsulfonyl)phenoxy)-5-(4-hydroxyphenylsulfonyl)phenol represented by the above chemical formula (S2) relative to the total mass of the dihydroxydiphenylsulfone mixture was calculated.

[Glass Transition Temperature of Cured Product of Epoxy Resin Composition]

A cured product of the epoxy resin composition was produced using the method described below, and the glass transition temperature (° C.) of the cured product of the epoxy resin composition was determined based on the tan δ peak measured using a dynamic viscoelasticity measurement device (Q800, manufactured by TA Instruments, Inc.) under the following conditions.

(Conditions)
Measurement mode: tensile mode
Amplitude: 20 μm
Frequency: 20 Hz
Rate of temperature increase: 5° C./minute

[Storage Elastic Modulus at 150° C. of Cured Product of Epoxy Resin Composition]

A cured product of the epoxy resin composition was produced using the method described below, and the storage elastic modulus (GPa) of the cured product of the epoxy resin composition at 150° C. was measured using a dynamic viscoelasticity measurement device (Q800, manufactured by TA instruments, Inc.) under the conditions described above.

<Production of Aromatic Polysulfone Resins>

Examples 1 to 4, Comparative Example 1

In the production of the aromatic polysulfone resins described below, 4,4'-dihydroxydiphenylsulfone, 2-(4-(4-hydroxyphenylsulfonyl)phenoxy)-S-(4-hydroxyphenylsulfonyl)phenol, and 4,4'-dichlorodiphenylsulfone (purity: 100%) were used as raw material monomers.

In Examples 1 to 4, a dihydroxydiphenylsulfone mixture containing a mixture of 4,4'-dihydroxydiphenylsulfone and 2-(4-(4-hydroxyphenylsulfonyl)phenoxy)-5-(4-hydroxyphenylsulfonyl)phenol was used.

Example 1

A polymerization tank with a capacity of 500 mL fitted with a stirrer, a nitrogen inlet tube, a thermometer, and a condenser with a receiver attached to the top end was charged with 100.1 g of a dihydroxydiphenylsulfone mixture (2-(4-(4-hydroxyphenylsulfonyl)phenoxy)-5-(4-hydroxyphenylsulfonyl)phenol content: 0.27% by mass relative to 100% by mass of the dihydroxydiphenylsulfone mixture), 115.2 g of 4,4'-dichlorodiphenylsulfone, and 188.2 g of diphenylsulfone as a polymerization solvent, and the temperature was raised to 180° C. to obtain a solution while the inside of the system was flushed with nitrogen gas. Subsequently, 59.0 g of potassium carbonate was added to the obtained solution, the temperature was then raised gradually to 290° C. and reaction was continued for 3 hours at 290° C. to obtain a reaction liquid. The thus obtained reaction liquid was cooled to room temperature (for example, 23° C.) and solidified, and following fine grinding of the product, washing with warm water and washing with a mixed solvent of acetone and methanol were repeated a number of times, and the product was then dried by heating at 150° C. thus obtaining a white powder of an aromatic polysulfone resin. Measurement of the reduced viscosity of the obtained aromatic polysulfone resin yielded a result of 0.52 (dl/g).

Example 2

With the exception of altering the 2-(4-(4-hydroxyphenylsulfonyl)phenoxy)-5-(4-hydroxyphenylsulfonyl)phenol content in the dihydroxydiphenylsulfone mixture to 0.32% by mass, an aromatic polysulfone resin was obtained in the same manner as Example 1. Measurement of the reduced viscosity of the obtained aromatic polysulfone resin yielded a result of 0.51 (dl/g).

Example 3

With the exception of altering the 2-(4-(4-hydroxyphenylsulfonyl)phenoxy)-5-(4-hydroxyphenylsulfonyl)phenol content in the dihydroxydiphenylsulfone mixture to 0.37% by mass, an aromatic polysulfone resin was obtained in the same manner as Example 1. Measurement of the reduced viscosity of the obtained aromatic polysulfone resin yielded a result of 0.52 (dl/g).

Example 4

With the exception of altering the 2-(4-(4-hydroxyphenylsulfonyl)phenoxy)-5-(4-hydroxyphenylsulfonyl)phenol content in the dihydroxydiphenylsulfone mixture to 0.48% by mass, an aromatic polysulfone resin was obtained in the same manner as Example 1. Measurement of the reduced viscosity of the obtained aromatic polysulfone resin yielded a result of 0.52 (dl/g).

Comparative Example 1

With the exception of using only 4,4'-dihydroxydiphenylsulfone instead of the dihydroxydiphenylsulfone mixture, an aromatic polysulfone resin was obtained in the same manner as Example 1.

Measurement of the reduced viscosity of the obtained aromatic polysulfone resin yielded a result of 0.52 (dl/g).

For each of the aromatic polysulfone resins obtained in the examples, the reduced viscosity and the molar ratio (m:(n+½)) between the repeating unit (I) and the repeating unit (II) are shown in Table 1.

The molar ratio (m:(n+½)) between the repeating unit (I) and the repeating unit (II) that constitute the aromatic polysulfone resin was determined from the blend amounts (moles) of the raw material monomers. The raw material monomers were confirmed to have been completely consumed in the polycondensation reaction.

TABLE 1

| Aromatic polysulfone resin | Example 1 | Example 2 | Example 3 | Example 4 | Comparative Example 1 |
|---|---|---|---|---|---|
| Reduced viscosity (dl/g) | 0.52 | 0.51 | 0.52 | 0.52 | 0.52 |
| Molar ratio (m:(n + 1/2)) between repeating unit (I) and repeating unit (II) | 1:370 | 1:312 | 1:270 | 1:208 | 0:100 |

<Production of Epoxy Resin Compositions>

Examples 5 to 8, Comparative Example 2

Using the aromatic polysulfone resin from each example, an epoxy resin composition was prepared in the following manner.

Example 5

A 500 mL separable flask was charged with 10 g of the aromatic polysulfone resin obtained in Example 1 and 100 g of SUMI-EPOXY ELM-100 (manufactured by Sumitomo Chemical Co., Ltd.), and after stirring at 120° C. for one hour, the mixture was cooled to 100° C., 45 g of bis(4-aminophenyl)sulfone (manufactured by Aldrich Japan K.K.) was added, and the resulting mixture was stirred at 100° C. for one hour to obtain an epoxy resin composition.

Example 6

With the exception of replacing the aromatic polysulfone resin with the resin obtained in Example 2, an epoxy resin composition was obtained in the same manner as Example 5.

Example 7

With the exception of replacing the aromatic polysulfone resin with the resin obtained in Example 3, an epoxy resin composition was obtained in the same manner as Example 5.

Example 8

With the exception of replacing the aromatic polysulfone resin with the resin obtained in Example 4, an epoxy resin composition was obtained in the same manner as Example 5.

Comparative Example 2

With the exception of replacing the aromatic polysulfone resin with the resin obtained in Comparative Example 1, an epoxy resin composition was obtained in the same manner as Example 5.

The epoxy resin composition obtained in each example was used to fill a metal frame with a thickness of 3 mm, and the composition was then cured by heating at 180° C. for 2 hours using a high-temperature hot-air dryer, thus obtaining a cured product of the epoxy resin composition.

The glass transition temperature and the storage elastic modulus at 150° C. were measured for the obtained cured product of the epoxy resin composition, with the measurement results shown in Table 2.

TABLE 2

| Epoxy resin composition | Example 5 | Example 6 | Example 7 | Example 8 | Comparative Example 2 |
|---|---|---|---|---|---|
| Aromatic polysulfone resin | Example 1 | Example 2 | Example 3 | Example 4 | Comparative Example 1 |
| Cured product glass transition temperature (° C.) | 269 | 266 | 268 | 269 | 265 |
| Cured product storage elastic modulus at 150° C. (GPa) | 2.13 | 2.32 | 2.24 | 1.96 | 1.91 |

Based on the results in Table 2, it was confirmed that, compared with the cured product that used the epoxy resin composition of Comparative Example 1, the cured products using the epoxy resin compositions of Examples 5 to 8 exhibited a larger value for the storage elastic modulus at 150° C. and superior compressive strength even under high-temperature conditions.

INDUSTRIAL APPLICABILITY

The aromatic polysulfone resin, epoxy resin composition and prepreg of the present invention can provide a molded body that exhibits high compressive strength even under high-temperature conditions, and are therefore extremely useful industrially.

The invention claimed is:

1. An aromatic polysulfone resin produced by polycondensation of 4,4'-dihydroxydiphenylsulfone represented by chemical formula (S1) shown below and 2-(4-(4-hydroxyphenylsulfonyl)phenoxy)-5-(4-hydroxyphenylsulfonyl)phenol represented by chemical formula (S2) shown below with 4,4'-dichlorodiphenylsulfone represented by chemical formula (S3) shown below:

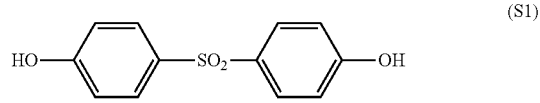

(S1)

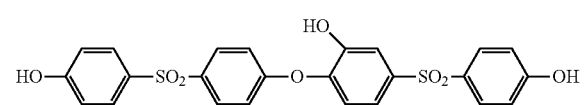

(S2)

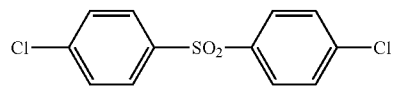

(S3)

wherein hydrogen atoms in phenylene groups in formula (S1), formula (S2) and formula (S3) may be each independently substituted with an alkyl group, an aryl group or a halogen atom.

2. An epoxy resin composition comprising the aromatic polysulfone resin according to claim 1, a liquid epoxy resin, and a curing agent.

3. A prepreg produced by impregnating a reinforcing fiber with the epoxy resin composition according to claim 2.

4. The prepreg according to claim 3, wherein the reinforcing fiber is carbon fiber.

5. A molded body comprising a cured product of the prepreg according to claim 4.

6. A molded body comprising a cured product of the prepreg according to claim 3.

7. The epoxy resin composition according to claim 2,
wherein the liquid epoxy resin is an epoxy resin that exists in a liquid state at 50° C. under normal pressure, the liquid epoxy resin is selected from the group consisting of glycidylamine epoxy resins, phenol novolac epoxy resins, cresol novolac epoxy resins, glycidyl ether epoxy resins, bisphenol A epoxy resins, bisphenol F epoxy resins, and bisphenol S epoxy resins, and
wherein the curing agent is an amine-based curing agent selected from the group consisting of tetramethylguanidine, imidazole or derivatives thereof, carboxylic acid hydrazides, tertiary amines, aromatic amine, aliphatic amines, and dicyandiamide or derivatives thereof.

8. The epoxy resin composition according to claim 7, which comprises the aromatic polysulfone resin of 3 to 30% by mass, the liquid epoxy resin of 40 to 80% by mass, and the curing agent of 20 to 50% by mass, relative to the total mass of the epoxy resin composition.

9. The aromatic polysulfone resin according to claim 1, which comprises at least one repeating unit (I) selected from the group consisting of a repeating unit represented by chemical formula (Ia) shown below, a repeating unit represented by chemical formula (Ib) shown below, a repeating unit represented by chemical formula (Ic) shown below and a repeating unit represented by chemical formula (Id) shown below, and
a repeating unit (II) represented by chemical formula (II) shown below;

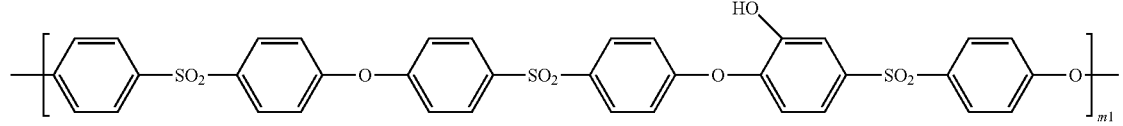

(Ia)

-continued (Ib)

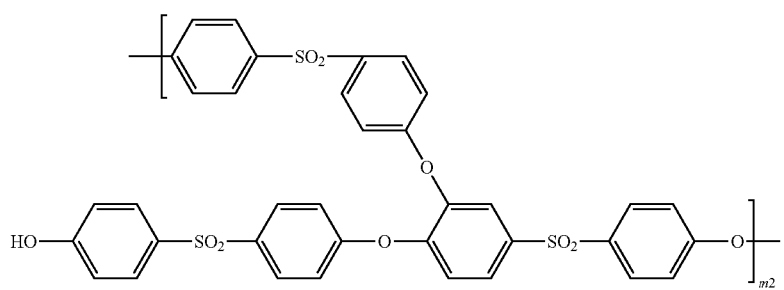

(Ic)

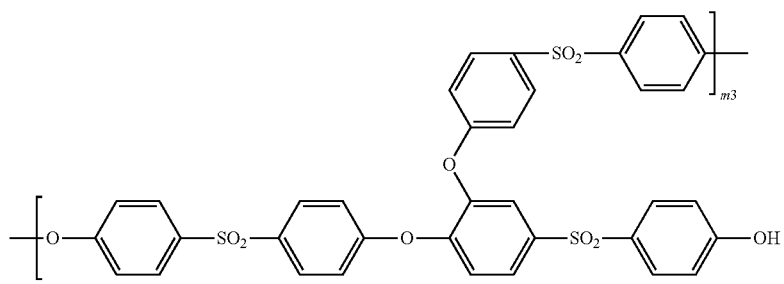

(Id)

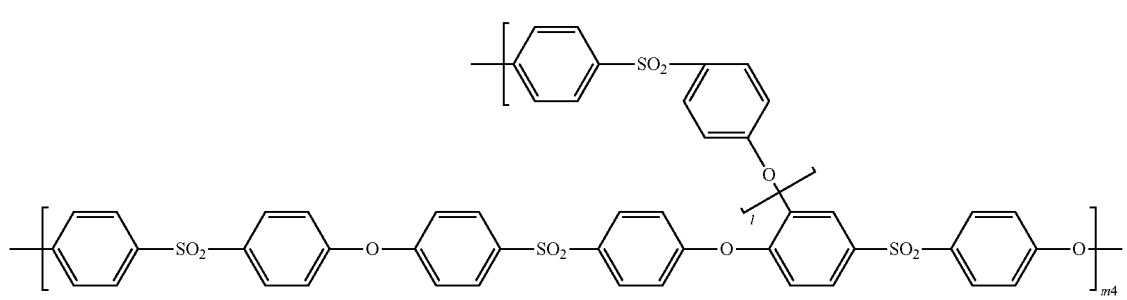

wherein 1 represents an integer of 0 or greater, each of m1, m2, m3 and m4 represents a number of 0 or greater, wherein m1+m2+m3+m4=m>0, and hydrogen atoms in phenylene groups in formula (Ia) to formula (Id) may be each independently substituted with an alkyl group, an aryl group or a halogen atom;

(II)

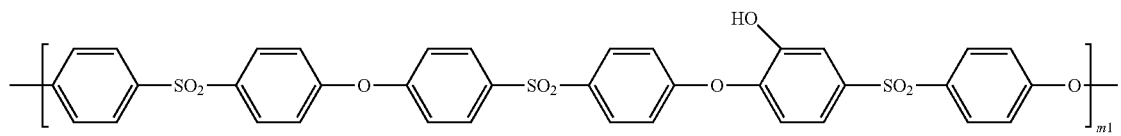

wherein n represents a number greater than 0, and hydrogen atoms in the phenylene groups in the formula may be each independently substituted with an alkyl group, an aryl group or a halogen atom; and wherein the aromatic polysulfone resin has the repeating unit (I) of 0.1 to 20 mol % and the repeating unit (II) of 80 to 99.9 mol %, relative to the total number of moles of all the repeating units that constitute the aromatic polysulfone resin.

10. The aromatic polysulfone resin according to claim 9, wherein the aromatic polysulfone resin has the repeating unit (I) of 0.1 to 0.4 mol % and the repeating unit (II) of 99.6 to 99.9 mol %, relative to the total number of moles of all the repeating units that constitute the aromatic polysulfone resin.

11. The aromatic polysulfone resin according to claim 1, which comprises at least one repeating unit (I) selected from the group consisting of a repeating unit represented by chemical formula (Ia) shown below, a repeating unit represented by chemical formula (Ib) shown below, a repeating unit represented by chemical formula (Ic) shown below and a repeating unit represented by chemical formula (Id) shown below, and a repeating unit (II) represented by chemical formula (II) shown below;

(Ia)

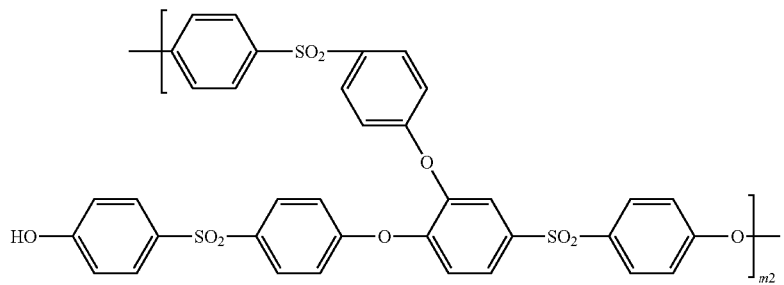

(Ib)

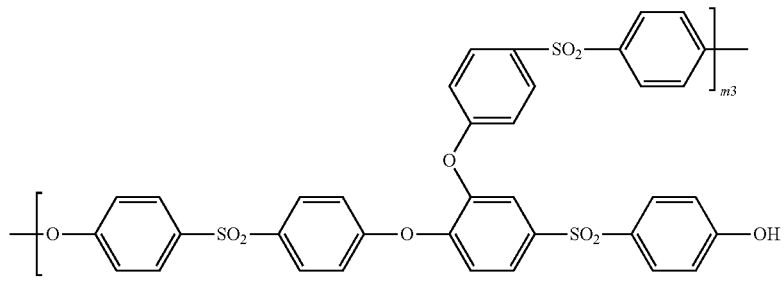

(Ic)

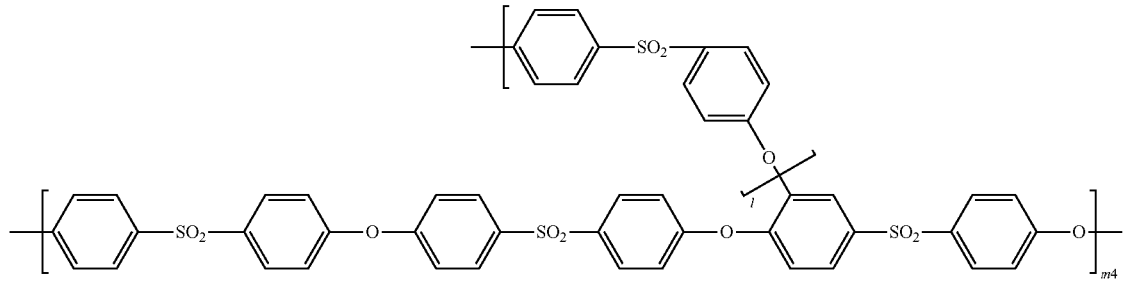

(Id)

wherein 1 represents an integer of 0 or greater, each of m1, m2, m3 and m4 represents a number of 0 or greater, wherein m1+m2+m3+m4=m>0, and hydrogen atoms in phenylene groups in formula (Ia) to formula (Id) may be each independently substituted with an alkyl group, an aryl group or a halogen atom;

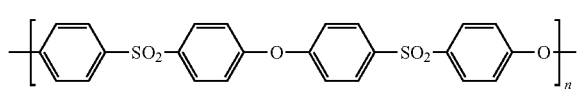

(II)

wherein n represents a number greater than 0, and hydrogen atoms in the phenylene groups in the formula may be each independently substituted with an alkyl group, an aryl group or a halogen atom; and wherein a ratio between the molar content (m) of the repeating unit (I) and the molar content (n) of the repeating unit (II) is within a range from 1:450 to 1:200.

12. The aromatic polysulfone resin according to claim 11, wherein the ratio between the molar content (m) of the repeating unit (I) and the molar content (n) of the repeating unit (II) is within a range from 1:400 to 1:250.

13. The aromatic polysulfone resin according to claim 11, wherein the ratio between the molar content (m) of the repeating unit (I) and the molar content (n) of the repeating unit (II) is within a range from 1:350 to 1:250.

14. The aromatic polysulfone resin according to claim 11, wherein the ratio between the molar content (m) of the repeating unit (I) and the molar content (n) of the repeating unit (II) is within a range from 1:350 to 1:280.

* * * * *